United States Patent [19]

Archey et al.

[11] Patent Number: 5,464,893
[45] Date of Patent: Nov. 7, 1995

[54] RADIATION-RESISTANT POLYCARBONATES

[75] Inventors: Rick L. Archey, Pleasant Hills; Charles E. Lundy, Pittsburgh; Aaron D. Meltzer, Pittsburgh; Harald Pielartzik, Pittsburgh, all of Pa.; Gerhard Fennhoff, Willich, Germany; Ralf Hufen, Duisburg, Germany; Klaus Kircher, Leverkusen, Germany; Rudiger Schubart, Berg-Gladbach, Germany; Richard Weider, Leverkusen, Germany

[73] Assignees: Bayer Aktiengesellschaft, Leverkusen, Germany; Bayer Corporation, Pittsburgh, Pa.

[21] Appl. No.: 216,576

[22] Filed: Mar. 22, 1994

Related U.S. Application Data

[63] Continuation-in-part of Ser. No. 18,623, Feb. 17, 1993, abandoned, and Ser. No. 85,067, Jun. 29, 1993, abandoned.

[51] Int. Cl.$^6$ .................................................. G08K 5/36
[52] U.S. Cl. .................... 524/366; 524/368; 524/392; 524/114; 524/130; 524/133; 524/140; 524/147; 524/198; 524/280; 524/284; 524/391
[58] Field of Search ...................... 524/366, 368, 524/392, 114, 130, 133, 140, 147, 198, 280, 284, 366, 391

[56] References Cited

U.S. PATENT DOCUMENTS

| | | | |
|---|---|---|---|
| 2,645,659 | 7/1953 | Morris et al. | 524/368 |
| 3,163,620 | 12/1964 | von Brachel | 524/368 |
| 4,451,641 | 5/1984 | Sublett et al. | 528/295.5 |
| 4,624,972 | 11/1986 | Nace | 523/136 |
| 4,904,710 | 2/1990 | Nace | 523/137 |
| 4,904,717 | 2/1990 | Ho et al. | 524/392 |
| 5,030,679 | 7/1991 | Bohen et al. | 524/368 |
| 5,081,169 | 1/1992 | Bohen et al. | 524/368 |

FOREIGN PATENT DOCUMENTS

| | | |
|---|---|---|
| 152012 | 8/1985 | European Pat. Off. . |
| 303894 | 2/1989 | European Pat. Off. . |
| 551608 | 7/1993 | European Pat. Off. . |

*Primary Examiner*—Kriellion S. Morgan
*Attorney, Agent, or Firm*—Joseph C. Gil; Aron Preis

[57] ABSTRACT

A thermoplastic molding composition stabilized against γ-rays and its application for manufacture of medical equipment is disclosed. The composition contains an aromatic polycarbonate and (i) dialkyl and/or dicycloalkyl monosulfides or polysulfides in an amount of 0.001 to 5 weight %, and optionally (ii) aliphatic or cycloaliphatic monoalcohols or polyalcohols or their derivatives in an amount of 0.001 to 2 weight % said percent being relative to 100 weight % of aromatic polycarbonate.

16 Claims, No Drawings

5,464,893

RADIATION-RESISTANT POLYCARBONATES

CROSS-REFERENCE TO RELATED APPLICATION

This application is a Continuation-In-Part of application Ser. No. 08/018,623 filed Feb. 17, 1993 now abandoned, and application Ser. No. 08/085,067 filed Jun. 29, 1993, now abandoned.

FIELD OF THE INVENTION

The subject of this invention is thermoplastic compositions containing an aromatic polycarbonate resin and (i) dialkyl and/or dicycloalkyl monosulfides or polysulfides in an amount of 0.001 to 5 weight %, preferably 0.005 to 1 weight %, in particular 0.01 to 0.8 weight %, each based on 100 weight % of aromatic polycarbonate, and optionally (ii) aliphatic or cycloaliphatic monoalcohols or polyalcohols or their derivatives in an amount of 0.001 to 2 weight %, preferably 0.001 to 1.5 weight %, based on 100 weight % of an aromatic polycarbonate.

SUMMARY OF THE INVENTION

The polycarbonate compositions of the invention are stabilized against gamma γ-rays and, therefore, are well suited for medical applications in a multitude of ways, especially for the manufacture of equipment or equipment parts which must be sterilized either before or after use through ionizing radiation, while avoiding the occurrence of excessive yellowing.

BACKGROUND OF THE INVENTION

The subject of the invention is, therefore, also the application of the stabilized polycarbonates according to the invention for the manufacture of medical equipment or components for medical equipment.

Thermoplastic, aromatic polycarbonates in the sense of the invention are both homopolycarbonates and copolycarbonates; the polycarbonates can be linear or branched by known means.

A portion, up to 80 mol %, preferably between 20 and 50 mol % of the carbonate groups in the appropriate polycarbonates based on the invention can be replaced by aromatic dicarboxylic acid ester groups. Such polycarbonates can contain not only built-in carbonic acid radicals, but also acid radicals of aromatic dicarboxylic acids in the molecular chain, more precisely described as aromatic polyester carbonates. These are referred to in the present application for purposes of simplicity under the generic term of thermoplastic, aromatic polycarbonates.

The production of the polycarbonate useful in the context of the invention is known. These are produced from diphenols, carbonic acid derivatives, optionally with chain terminators and branching agents, whereby a part of the carbonic acid derivatives may be replaced by aromatic dicarboxylic acid or derivatives of dicarboxylic acid for the production of the polyester carbonate.

Details of polycarbonate production have been specified in hundreds of patent specifications for about 40 years. A few of them are pointed out, for example, in Schnell's Chemistry and Physics of Polycarbonates, Polymer Reviews, Volume 9, Inter-science Publishers, New York, London, Sydney 1964; D. C. PREVORSEK, B. T. DEBONA and Y. KESTEN, Corporate Research Center, Allied Chemical Corporation, Morristown, N.J. 07960, "Synthesis of Poly(ester Carbonate) Copolymers" in the Journal of Polymer Science, Polymer Chemistry Edition, Vol. 18, 75–90 (1980); D. Freitag, U. Grigo, P. R. Müller, H. Nonvertue, BAYER AG, "Polycarbonates" in the Encyclopedia of Polymer Science and Engineering, Volume 11, Second Edition, 1988, pages 648–718, and finally Drs. U. Grigo, K. Kircher and P. R. Müller "Polycarbonate" in Becker/Braun, Plastics-Handbook, Volume 3/1, Polycarbonate, Polyacetals, Polyester, Cellulose Ester, Carl Hanser Verlag München, Wien 1992, pages 117–299.

Thermoplastic polycarbonates, including the thermoplastic, aromatic polyester carbonates, have weight average molecular weights Mw (determined by measuring the relative viscosity at 25° C. in $CH_2Cl_2$ and a concentration of 0.5 g per 100 ml $CH_2Cl_2$) between 12,000 and 120,000, preferably between 18,000 and 80,000 and in particular between 22,000 and 60,000.

Diphenols suitable for the production of the polycarbonate to be stabilized in accordance with the invention are hydroquinone, resorcinol, dihydroxydiphenyls, bis-(hydroxyphenyl)-alkanes, bis(hydroxyphenyl)-cycloalkanes, bis-(hydroxyphenyl)sulfides, bis-(hydroxyphenyl)-ether, bis-(hydroxyphenyl)-ketones, bis-(hydroxy-phenyl)-sulfones, bis-(hydroxyphenyl)-sulfoxides, α, α'-bis-(hydroxyphenyl)-diisopropyl benzene, as well as their nucleous alkylated and nucleous halogenated compounds.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4 -hydroxyphenyl)-p-diisopropyl benzene, 2,2-bis-(3-methyl-4-hydroxyphenyl)-propane, 2,2-bis(3-chloro-4-hydroxyphenyl)-propane, bis-(3,5-dimethyl-4 -hydroxyphenyl)-methane, 2,2-bis-(3,5-dimethyl-4-hydroxyphenyl)-propane, bis-(3,5-dimethyl-4-hydroxyphenyl)-sulfones, 2,4-bis-(3,5-dimethyl-4-hydroxyphenyl)-2-methylbutane, 1,1-bis-(3,5-dimethyl-4 -hydroxyphenyl)-p-diisopropyl benzene, 2,2-bis-(3,5-dichloro-4-hydroxyphenyl)-propane, 2,2-bis-(3,5-dibromo-4-hydroxy-phenyl)-propane and 1,1-bis-(4-hydroxyphenyl)-3,3,5-trimethyl-cyclohexane.

Especially preferred diphenols are 2,2-bis-(4-hydroxyphenyl)-propane, 2,2-bis-(3,5-dimethyl-4-hydroxyphenyl)-propane, 2,2-bis-(3,5-dichloro-4 -hydroxyphenyl)-propane, 2,2-bis-(3,5-dibromo-4-hydroxyphenyl)-propane, 1,1 -bis-(4-hydroxyphenyl)-cyclohexane and 1,1 ,-bis-(4-hydroxyphenyl)-3,3,5 -trimethylcyclohexane.

These and other suitable diphenols are described in U.S. Pat. Nos. 3,028,635, 2,999,835, 3,148,172, 2,991,273, 3,271,367, 4,982,014 and 2,999,846; in the German Specifications 1,570,703, 2,063,050, 2,036,052, 2,211,956, and 3,832,396; the French Patent 1,561,518; in the monograph "H. Schnell, Chemistry and Physics of Poly-carbonates, Interscience Publishers, New York 1964", as well as in the Japanese Specifications 62039/1986, 62040/1986 and 105550/1986.

In the case of the homopolycarbonates, only one diphenol is used; in the case of the copolycarbonates, several diphenols are used.

Suitable chain terminators are both monophenols and monocarboxylic acids. Suitable monophenols are phenol itself, alkylphenols like cresol, p-tert-butylphenol, p-n-octylphenol, p-iso-octylphenol, p-n-nonylphenol and p-iso-nonylphenol, halogenphenols, such as p-chlorophenol, 2,4-dichlorophenol, p-bromophenol and 2,4,6-tribromophenol.

Suitable monocarboxylic acids are benzoic acid, alkylbenzoic acids and halogenbenzoic acids.

Preferred chain terminators are the phenols of the formula (I)

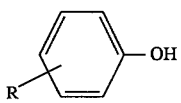

wherein
R is a branched or unbranched $C_8$-alkyl and/or $C_9$-alkyl radical.

The quantity of chain terminator to be used is between 0.5 and 10 mol %, based on moles of the diphenols. The addition of the chain terminators can be made before, during, or after the phosgenation.

Suitable branching agents suitable for polycarbonate are the well known compounds having a functionality of three or more, in particular, those with three or more phenolic OH-groups.

Suitable branching agents include phloroglucinol, 4,6-dimethyl-2,4,6-tri-(4-hydroxyphenyl)-heptene-2, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cylclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenyl-isopropyl)-phenyl)-ortho-tereph-thalic acid ester, tetra-(4-hydroxyphenyl)-methane, tetra-(4-4(hydroxylphenyl-isoproyl)-phenoxy)-methane and 1,4-bis-(4', 4"-dihydroxytriphenyl)-methyl)-benzene, as well as 2,4-dihydroxybenzoic acid, trimesic acid, cyanuric chloride and 3,3-bis-(3-methyl-4-hydroxy-phenyl)-2-oxo-2,3-dihydroindol.

The quantity of branching agent to be used is between 0.05 and 2 mol %, based on the moles of the diphenols used in each case.

Branching agents can either be included with the diphenols and the chain terminators in an alkaline aqueous phase, or can be added or dissolved in an organic solvent prior to phosgenation.

All these measures for the production of polycarbonates are known to the expert.

Suitable aromatic dicarboxylic acids for the production of polyester carbonate are, for example, orthophthalic acid, terephthalic acid, isophthalic acid, tert-butylisophthalic acid, 3,3'-diphenyldi-carboxylic acid, 4,4'-diphenyldicarboxylic acid, 4,4'-benzophenone dicarboxylic acid, 3,4-benzophenone dicarboxylic acid, 4,4'-diphenyl-ether dicarboxylic acid, 4,4'-diphenylsulfone dicarboxylic acid, 2,2-bis-(4-carboxy-phenyl)-propane, trimethyl-3-phenylindane-4,5'-dicarboxylic acid.

From the aromatic dicarboxylic acids, terephthalic acid and/or isophthalic acid are preferably used.

Derivatives of the dicarboxylic acids are dicarboxylic acid dihalogenides, and the dicarboxylic acid dialkylesters, especially the dicarboxylic acid dichlorides and the dicarboxylic acid dimethyl esters.

The application of carbonate groups through the aromatic dicarboxylic acid ester groups is basically stoichiometric, and also quantitative, such that the molecular ratio of the reaction partners is also reflected in the finished polyester carbonate. The incorporation of the aromatic dicarboxylic acid ester groups can be made either in statistical or blocked operation.

Preferred methods of producing polycarbonate suitable in the present context, including the polyestercarbonates, are the well known interfacial surface polycondensation process and the melt transesterification process.

In the first case, phosgene serves preferably as the carbonic acid derivative; in the second case, diphenylcarbonate.

Catalysts, solvents, preparations, reaction conditions, etc. are in both cases conventional and well known.

Suitable dialkyl- and dicycloalkyl- monosulfides and polysulfides conform to

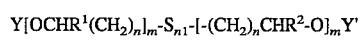

wherein $n_1$ is a whole number between 1 and 6, and where Y and Y' independently one of the other denote a hydrogen atom or a $C_{1-40}$ alkyl, or $C_3$-$C_{15}$-cycloalkyl radicals or acyl radicals, a pyranyl, or silyl group, m is 0 to 70, n is 1 to 4, and $R^1$ and $R^2$ independently denote hydrogen $C_{1-22}$ alkyl, cycloalkyl aryl, alkylaryl or cycloalkyl-aryl radicals. Preferred alkyl radicals are linear chains such as $C_{12}H_{25}$, $C_{16}H_{33}$, $C_{17}H_{35}$ and $C_{18}H_{37}$, and branched such as t-$C_{12}H_{25}$; preferred cycloalkyl radicals are cyclopentyl, cyclohexyl, and cycloheptyl.

The index "n" has a value from 1 to 6, preferably from 2 to 4.

Suitable substituent groups on the alkyl radicals and the cycloalkyl radicals are —SH, $C_1$–$C_5$-alkoxy, $C_1$–$C_5$-alkylthio, phenoxy, phenylthio, —COOH, alkoxycarbonyl, aryloxycarbonyl,

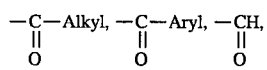

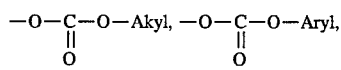

—$SO_3H$, —$SO_3$-alkyl, —$SO_3$-aryl, —$SO_2H$, —$SO_2$-alkyl, $SO_2$-aryl, SOH, —SO-alkyl, —SO-aryl and for the alkyl radicals $R^1$ and $R^2$ cycloalkyl and aryl and for the cycloalkyl radicals $R^1$ and $R^2$ alkyl and aryl, whereby these last alkyl-substitutes could be saturated or unsaturated.

Preferred compounds (11) are those where "n" equals 2.

where $R^1$ and $R^2$ independently are $C_{1-40}$alkyl or hydroxyalkyl radicals, more preferably $C_{2-12}$alkyl or $C_{2-30}$-hydroxyalkyl radicals, especially $C_{12-18}$alkyl or hydroxyalkyl radicals are especially preferred. 2-hydroxyethyldisulfide is an example of a suitable compound.

In an additionally preferred embodiment of the invention the disulfide conforms to

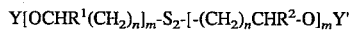

wherein Y and Y' independently one of the other denote a hydrogen atom or a $C_{1-40}$ alkyl, or $C_3$-$C_{15}$-cycloalkyl radicals or acyl radicals, a pyranyl, or silyl group, m is 0 to 70, n is 1 to 4, and $R^1$ and $R^2$ independently denote hydrogen $C_{1-22}$ alkyl, cycloalkyl aryl, alkylaryl or cycloalkyl-aryl radicals.

The compounds of the formula (11) are known from the literature and may be produced based on a literature-known process (see, Houben-Weyl, "Methods in Organic Chemistry", Volume E 11, "Organic Sulfur Compounds", Georg Thieme, Publisher, Stuttgart-New York, 1985).

Examples of compounds of the formula (11) are dicyclohexyldisulfide, $C_{12}H_{25}$-SS-$C_{12}H_{25}$, t-$C_{12}H_{25}$-SS-t-$C_{12}H_{25}$, $C_{16}H_{33}$-SS-$C_{16}H_{33}$, $C_{17}H_{35}$-SS-$C_{17}H_{35}$ and $C_{18}H_{37}$-SS-$C_{18}H_{37}$.

The aliphatic or cycloaliphatic monoalcohols or polyalcohols suitable as additives are preferably $C_1$–$C_{20}$-monoalcohols, aliphatic $C_2$–$C_{20}$-dialcohols, aliphatic $C_3$–$C_{20}$-trialcohols and aliphatic $C_4$–$C_2$-tetraalcohols, cycloaliphatic $C_3$–$C_{12}$-monoalcohols, and cycloaliphatic $C_3$–$C_{12}$-dialcohols.

These monoalcohols and polyalcohols are known from the literature (see, for example, Houben-Weyl, "Methods of Organic Chemistry", Volume 6/1a/1, "Alcohols I", Volume 6/1a/2, "Alcohols II" and Volume 6/1b, "Alcohols III", Georg Thieme, Publisher, Stuttgart-New York, 1979, 1980 and 1984).

Preferred monoalcohols are dodecanol, hexadecanol-(1), hexadecanol-(2), stearylalcohol, octadecanol and eicosanol.

Preferred polyalcohols are diols, triols, tetraols, pentaols and hexaols, especially diols of the formula (III)

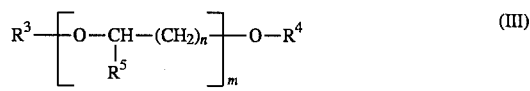

wherein, the following are $R^3=R^4=H$; $R^5$, H or $C_1$–$C_4$-alkyl; n a whole number between 1 and 36, and m a whole number between 1 and 1500, preferably between 2 and 1200 and in particular between 3 and 1000.

Examples for it are, ethylene glycol, 1,2-propane diol, 1,3-propane diol, 1,2-butane diol, 1,3-butane diol, 1,4-butane diol, 2,3-butane diol, 1,2-pentane diol, 1,5-pentane diol, 2,4-pentane diol, 1,2-hexane diol, 1,6-hexane diol, 3-methyl-1,5-pentane diol, 2,5-hexane diol, 1,2-cyclohexane diol, 1,4-cyclohexane diol, cyclohexyl-1,4-dimethanol, 2-methyl-2,4-pentane diol, 1,8-octane diol, 1,10-decane diol, 1,2-undecane diol, 1,2-dodecane diol, 1,12-dodecane diol, 1,2-hexadecane diol, 1,2,5-pentane triol, 1,2,3-hexane triol, 1,2,6-hexane triol, 2-(hydroxymethyl)-2-methyl-1,3 -propane diol and 2,3,4,5,6,7,-octane hexaol.

Derivatives of monoalcohols or polyalcohols suitable based on the invention are their ethers, carboxylic esters, acetals, alkylcarbonates, epoxides, urethanes, phosphate esters, phosphonate esters, phosphoric esters, phosphonic esters, and siloxanes.

These derivatives are known from the literature and may be prepared by methods known from the literature (See the respective volumes of Houben-Weyl, "Methods of Organic Chemistry", Georg Thieme Publishers).

Preferred derivatives are ethers, carboxylic acid esters, acetals and alkylcarbonates of the monoalcohols or polyalcohols; examples for it are diethylene glycol, diethylene glycoldiethylether, dipropylene-glycol, tripropylene glycol, 1,3-diethoxy-2-propanol, 3,3'-oxibis-( 1,2-propane diol), 2,2'-oxibisbutane, the alkylesters of the undecanoic acid, dodecanic acid, hexadecanic acid, stearic acid and dodecanic acid, glycerin monostearate, glycerin distearate, glycerin tristearate, 1,1-bis-(2,3-dioctadecanyloxypropyloxy)-hexade-cane, 2,2-dicyclo-hexyloxypropane, acetoxy-(4-(2-tetrahydropyranyloxy)-pentyloxy)-methane, acetoxy-dodecyloxymethane, acetoxy-(3-(2-methyl-1,3-dioxolane-2-yl)-propyloxy)-methane, ethylenecarbonate, dimethylcarbonate, diethylcarbonate, dipropylcarbonate, diisopropylcarbonate and dineopentylcarbonate.

Especially well suited are such of the formula (III)

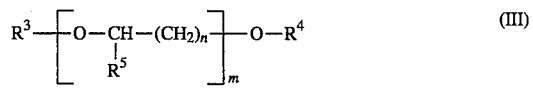

wherein
$R^3$ and $R^4$ independently are $C_1$ to $C_{30}$-alkyl, and may be either branched or unbranched, or acyl, silyl and/or pyranyl,
$R^5$ denotes H or $C_1$ to C4-alkyl,
n denotes a whole number from 1 to 36, and
m denotes a whole number from 1 to 1500, preferably from 2 to 1200 and in particular from 3 to 1000.

The compounds of the formula (Ill) may preferably have a molecular weight of from 106 g/mol to 100,000 g/mol, especially preferred from 150 g/mol to 12000 g/mol, and in particular from 500 g/mol to 10,000 g/mol.

The addition of the sulfides and optionally monoalcohols or polyalcohols or their derivatives to the polycarbonate may be either simultaneous or sequential at temperatures between 260 and 380° C. through the melting process of the polycarbonate, or through the solution of the polycarbonate in known solvents such as $CH_2Cl_2$ and/or chlorobenzene, and subsequent evaporation of the solvents in known ways.

The subject of the invention is, therefore, also a process for production of the polycarbonate to be stabilized according to the invention, which is characterized by the fact that the dialkyl or/and dicycloalkyl monosulfides or polysulfides, and optionally the aliphatic or cycloaliphatic monoalcohols or polyalcohols or their derivatives are mixed with polycarbonates at temperatures between 260 and 380° C. in mixing vessels that are normally used, as for example, a kneading or extrusion machinery, or that the dialkyl or/and dicycloalkyl monosulfides or polysulfides, and optionally the aliphatic or cycloaliphatic monoalcohols or polyalcohols or their derivatives are dissolved with polycarbonates in known solvents, such as $CH_2Cl_2$ and/or chlorobenzene, and the mixtures of the dialkyl- or/and dicycloalkyl monosulfides or polysulfides, and optionally the aliphatic or cycloaliphatic monoalcohols or polyalcohols or their derivatives obtained in this way are isolated with polycarbonates through subsequent evaporation of the solvents in known ways.

Suitable equipment for the production of polycarbonates to be stabilized according to the invention for the case of addition to the polycarbonate by melting is a kneader or extruder, and in the case of addition to the polycarbonate by solution vessel is a mixing agitated vessel.

The irradiation of polycarbonate molded pads with ionized radiation, such as, γ-rays or electronic rays is in order to sterilize objects, such as dialysators for blood exchange, one-way syringes, etc. prior to their medical use. Damage always occurs, thereby, for example, in the form of a yellowing of the polycondensate. In order to minimize this damage or to avoid it, the polycondensate must be stabilized prior to irradiation.

The stabilization of aromatic polycarbonates and/or aromatic copolycarbonates and/or aromatic polyestercarbonate against ionizing radiation, such as γ-rays and/or electronic rays is known from the literature. In U.S. Pat. No. 4,624,972 polycarbonate mixtures with aromatic polycarboxylic acid esters are specified, which are to a certain extent resistant against γ-radiation. The EP 152,012 and EP 228,525 specify mixtures of polycarbonates with non-polymeric compounds which show strong oxidation action and/or high turnover of reactants, such as, OH-radicals or solvating electrons that are formed by ionizing radiation. U.S. Pat. No. 4,451,641 describes copolyesters, which are stabilized to a certain extent through dimeric acids or dimeric glycols against damage by γ-radiation.

The stabilized polycarbonates based on the invention are neither described in the art, nor are they obvious.

On the contrary, it was surprising that the compounds of the formula (11), especially in combination with monoalcohols or polyalcohols or their derivatives can exert an excellent stabilizing effect on the polycarbonates or polyestercarbonates against the influence of γ-rays, such that the polycondensate to be stabilized clearly yellows less strongly in each case than the stabilizer systems already known from the present state of the art, which can be shown through determination of the difference in the yellowness index.

The polycarbonate stabilized against γ-rays based on the invention can still contain the normal additives such as thermo-stabilizers, UV-absorbers, flowing agents, demolding agents, softeners, antistatics, flame retardants and/or dyes, and for special applications also fillers, for example, glass fibers or glass spheres. The addition is made to the usual quantities of polycarbonate under normal conditions and machines. The addition can be made before, during, or after the stabilization based on the invention through sulfides and eventually alcohols or their derivatives.

The processing of the polycarbonates stabilized according to the invention to any molded parts, especially medical equipment, done using on known injection-molding and extrusion machines.

The application of parts molded from polycarbonates stabilized according to the invention can, aside from the medical field, also be used in the areas with foodstuffs contact, as packaging material of any form, as well as in all other application areas where polycarbon-ates are normally used.

The invention is further illustrated but is not intended to be limited by the following examples in which all parts and percentages are by weight unless otherwise specified.

EXAMPLES

The relative solvent viscosities (ηrl) of the polycondensates were determined at 25° C. For this, 0.500 g of the condensates each was dissolved in 100 ml dichloromethane.

Production of the Polycarbonate Mixtures with Stabilizers

The examples of the mixtures of polycarbonates with different stabilizers for the γ-irradiation listed in the following table were produced on a dual shaft extruder at 300° C. mass temperature. Color sample coupons (Size: 60 mm×40 mm× 4 mm) were produced at a 300° C. processing temperature from the mixtures obtained. These were sterilized with 3 Mrad γ-irradiation.

The combinations of the mixtures and the test results are summarized in the following table.

| | | | Results | | |
|---|---|---|---|---|---|
| Sample/ Additive | $(C_{18}H_{37}S)_2$ (weight %) | $(C_{18}H_{37}S)_2$ (weight %) | Polypropylene glycol of the formula (III) with $R^3 = R^4 = R^5$—H $M_w = 2000$ (weight %) | Polycarbonate based on bis- phenol A re. 1.289 (weight %) | Y.I |
| 1 | 0.1 | | 0.75 | 100 | 11.8 |
| 2 | 0.5 | | 0.75 | 100 | 5.0 |
| 3 | | 0.5 | 0.75 | 100 | 8.0 |
| Comparison | | | | 100 | 24 |
| Comparison | | | 0.75 | 100 | 13 |

Y.I = Yellowness Index
Y.I = Y.I 10 days after γ-irradiation - Y.I before γ-irradiation.

Experimental II

Molding compositions in accordance with the invention have been prepared and their properties determined. In the preparation of the compositions the resin used was a homopolycarbonate based on bisphenol-A having a melt flow rate of about 15 gm/10 min. The additives noted below were incorporated in the polycarbonate composition in the indicated amounts. Example I contained the stabilizer of the invention exemplified by mixture of a polyether polyol conforming to

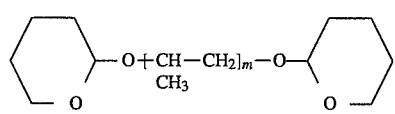

having a number average molecular weight of about 2000 and the aliphatic disulfide was 2-hydroxyethyldisulfide (HOCH₂CH₂SSCH₂CH₂OH).

In Example 2, only polyether polyol was used. Example 3 demonstrates the performance of polycarbonate resin without any stabilizers and Example 4 contains the polyether polyol and an aromatic disulfide-the subject of the above mentioned copending patent application Ser. No. 07/891, 875. Example 5 contained the polyether polyol and 2-pyranylethyldisulfide conforming to

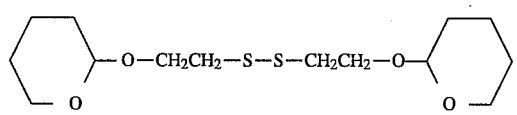

and Example 6 contained 2-pyranylethyldisulfide only as the stabilizer.

The polycarbonate and additives were tumble blended together and then extruded on a ZSK-30 twin screw extruder at a melt temperature of about 270° C. The extruded strands were cooled, chopped into pellets and the pellets then molded at about 280° C. into chips measuring 0.100 inch in thickness (about 0.25 cm.)

The chips were subjected to gamma radiation at doses of 3 mrad. The yellowness index (YI) of the as molded and as irradiated chips were determined in accordance with ASTM D 1925. The measurements were taken approximately 24 hours after exposure to the radiation.

The table below show the effect of the radiation on the several compositions.

|  | 1 | 2 | 3 | 4 | 5 | 6 |
|---|---|---|---|---|---|---|
| additive, % polyether polyol | 0.5 | 1.0 | — | 0.5 | 0.5 | — |
| 2-hydroxyethyl disulfide | 0.5 | — | — | — | — | — |
| diphenyl disulfide | — | — | — | 0.5 | — | — |
| 2-pyranyl ethyl disulfide | — | — | — | — | 0.1 | 0.1 |
| Yellowness index |  |  |  |  |  |  |
| Pre-radiation | 9.43 | 2.92 | 5.04 | 4.39 | 5.9 | 10.0 |
| after exposure | 10.73 | 14.1 | 24.5 | 8.7 | 11.5 | 14.1 |
| difference in yellowness index | 1.3 | 11.2 | 19.5 | 4.3 | 5.5 | 4.1 |

The results show the efficacy of the stabilizer of the present invention set in comparison to relevant compositions.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising an aromatic polycarbonate and (i) about 0.001 to 5% of a compound conforming to

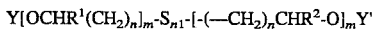
    $Y[OCHR^1(CH_2)_n]_m\text{-}S_{n1}\text{-}[\text{-}(CH_2)_nCHR^2\text{-}O]_mY'$ wherein $n_1$ is a whole number between 2 and 6, and where Y and Y' independently one of the other denote a hydrogen atom or a $C_{1-40}$ alkyl, or $C_3$–$C_5$-cycloalkyl radicals or acyl radicals, a pyranyl, or silyl group, m is 0 to 70, n is 1 to 4, and $R^1$ and $R^2$ independently denote hydrogen $C_{1-22}$ alkyl, cycloalkyl aryl, alkylaryl or cycloalkylaryl radicals, and (ii) 0.001 to 2% of a member selected from the group consisting of
    (a) aliphatic monoalcohol, cycloaliphatic monoalcohol, aliphatic polyalcohol and cycloaliphatic polyalcohol, and
    (b) derivatives of said alcohols selected from the group consisting of ethers, carboxylic acid esters, acetale, alkylcarbonates, epoxides, urethanes, phosphate esters, phosphonate esters, phosphoric esters, phosphonic esters and siloxanes, said percents being relative to the weight of the composition.

2. The composition of claim 1 wherein said aliphatic alcohols are selected from the group consisting of aliphatic $C_1$–$C_{20}$-monoalcohols, aliphatic $C_2$–$C_{20}$-dialcohols, aliphatic $C_3$–$C_{20}$-trialcohols and aliphatic $C_4$–$C_{20}$-tetraalcohols.

3. The composition of claim 1 wherein said cycloaliphatic alcohols are $C_3$–$C_{12}$-monoalcohols or $C_3$–$C_{12}$-dialcohols.

4. The composition of claim 1 wherein and Y and Y' independently denote $C_1$–$C_{40}$-alkyl radicals or $C_{3-C15}$-cycloalkyl radicals and wherein said (ii) conforms to the formula

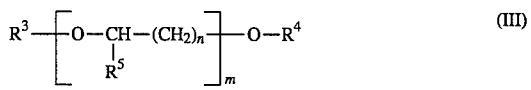
$$R^3\text{---}\left[\text{O---CH---(CH}_2)_n\atop\text{|}\atop R^5\right]_m\text{---O---R}^4 \qquad (III)$$

where $R^3$ and $R^4$ independently denote H, $C_1$- to $C_3$-alkyl, acyl, silyl or pyranyl, $R^5$ denotes H or $C_1$ to $C_4$-alkyl, n is a whole number between 1 and 36, and m is a whole number between 1 and 1500.

5. A thermoplastic molding composition comprising a polycarbonate resin and a stabilizing agent which includes (i) about 0.001 to 5% of a compound conforming to

    $Y[OCHR^1(CH_2)_n]_m\text{-}S_2\text{-}[\text{-}(CH_2)_nCHR^2\text{-}O]_mY'$ wherein Y and Y' independently one of the other denote a hydrogen atom or a $C_{1-40}$ alkyl, or $C_3$–$C_{15}$-cycloalkyl radicals or acyl radicals, a pyranyl, or silyl group, m is 0 to 70, n is 1 to 4, and $R^1$ and $R^2$ independently denote hydrogen $C_{1-22}$ alkyl, cycloalkyl aryl, alkylaryl or cycloalkylaryl radicals, and optionally (ii) a positive amount up to 5.0% of a polyether polyol conforming to

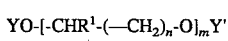
    $YO\text{-}[\text{-}CHR^1\text{-}(\text{---}CH_2)_n\text{-}O]_mY'$ where n, m, Y, Y', and $R^1$ are as defined above, said percents are relative to the weight of said composition.

6. The composition of claim 1 wherein said Y is a hydrogen or a $C_{1-5}$ alkyl or a pyranyl radicals and $R^1$ is a $C_{1-5}$ alkyl radical and where n is 1 and m is about 30.

7. The composition of claim 5 wherein said (i) and said (ii) each are present in amounts of 0.1 to 1.5%.

8. The composition of claim 5 wherein said (ii) is poly(propylene glycol).

9. The composition of claim 5 wherein in said (i) Y and Y' are pyranyl radicals.

10. The composition of claim 5 wherein said (i) is 2-hydroxyethyl disulfide.

11. The composition of claim 5 wherein said (i) is $(C_{18}H_{37}S)_2$.

12. An article of manufacture comprising the composition of claim 1.

13. A thermoplastic molding composition comprising a polycarbonate resin and a stabilizing agent which includes (i) about 0.1 to 1.5% $(C_{18}H_{37}S)_2$ and (ii) about 0.1 to 1.5% of a compound having a number average molecular weight of about 2000 conforming to

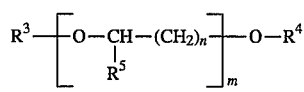 (III)

where
- $R^3$ and $R^4$ independently denote H, $C_1$- to $C_{30}$-alkyl, acyl, silyl or pyranyl,
- $R^5$ denotes H or $C_1$ to $C_4$-alkyl,
- n is a whole number between 1 and 36, and
- m is a whole number between 1 and 1500.

14. The composition of claim 13 wherein said compound conforming to

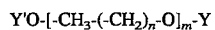

where Y and Y' both denote pyranyl radicals, said percents are relative to the weight of said composition.

15. The composition of claim 6 wherein said (i) is 2-hydroxyethyldisulfide.

16. An article of manufacture comprising the composition of claim 5.

* * * * *